United States Patent [19]

Huggett

[11] Patent Number: 4,823,630

[45] Date of Patent: Apr. 25, 1989

[54] DISTRIBUTOR FOR INDEPENDENTLY DISTRIBUTING ROTATIONAL DRIVE IN A SAILING CRAFT

[75] Inventor: Richard D. J. Huggett, Horndean, United Kingdom

[73] Assignee: Lewmar Marine Limited, England

[21] Appl. No.: 797,014

[22] Filed: Nov. 12, 1985

[30] Foreign Application Priority Data

Nov. 19, 1984 [GB] United Kingdom ................. 8429164

[51] Int. Cl.[4] .......................... F16H 5/06; F16H 37/06

[52] U.S. Cl. .................................. 74/337.5; 74/665 L; 74/661; 254/344; 254/346; 254/299

[58] Field of Search ................. 74/661, 665 L, 665 N, 74/665 P, 670, 337.5, 342, 343; 254/299, 346, 358, 365; 192/48.7, 48.9, 89 A

[56] References Cited

U.S. PATENT DOCUMENTS

| | | | |
|---|---|---|---|
| 1,990,810 | 2/1935 | Young | 74/665 L X |
| 2,151,881 | 3/1939 | Wilson | 74/661 X |
| 2,282,616 | 5/1942 | Spalding | 254/365 X |

FOREIGN PATENT DOCUMENTS

| | | | |
|---|---|---|---|
| 211398 | 6/1909 | Fed. Rep. of Germany | 254/299 |
| 125349 | 11/1931 | Fed. Rep. of Germany | 74/661 |
| 728560 | 10/1942 | Fed. Rep. of Germany | 74/337.5 |
| 741550 | 9/1943 | Fed. Rep. of Germany | 254/346 |
| 2423378 | 12/1974 | Fed. Rep. of Germany | 254/344 |
| 875447 | 8/1961 | United Kingdom | 74/337.5 |
| 1502704 | 3/1978 | United Kingdom . | |

OTHER PUBLICATIONS

"Yachting" magazine, vol. 148, Sep. 1980, pp. 48, 88–91.

"Yachting" magazine, vol. 153, Apr. 1983, p. 120.

*Primary Examiner*—Allan D. Hermann

*Assistant Examiner*—Dirk Wright

*Attorney, Agent, or Firm*—Cushman, Darby & Cushman

[57] ABSTRACT

A distributor for independent plural drive inputs (14,15) to plural drive outputs (12,13), especially for sailing craft, enables permutation of drives e.g. both to one output, both to the other or independently to each. Dog clutches (34–37) are engageable with both sides of the drive input sprockets (14,15) in various combinations. They are controlled by rotational setting of a cam shaft (20) with a plurality of face cams (21–24) respectively interacting with cam-follower discs (30–33) on the dog clutches.

12 Claims, 4 Drawing Sheets

DISTRIBUTOR FOR INDEPENDENTLY DISTRIBUTING ROTATIONAL DRIVE IN A SAILING CRAFT

This invention relates to the transmission of drive in sailing craft and particularly but not exclusively in competitive yachts where only manual drive is permitted in any of the operations of the yacht such as adjustment and hoisting of sails.

BACKGROUND OF THE INVENTION

In larger yachts to which this restriction applies, one or more members of the crew may have as their sole or principal purpose the provision of manual power, being stationed at a device, equipped with one or more handles to which they apply their muscular strength. Drive is taken from the handles through a transmission system to serve all of the sheet-handling and other winches of the yachts. Other crew members will control how sheets or other items are applied to those winches.

The transmission system may include a general speed reduction in the shape of one or more gearboxes and this or these may either be operated by the operator of the handle(s) or by some other crew member. Additionally or alternatively the individual winches may have multiple drive-transmission ratios within them, as between the transmission system of the yacht which is the input to that winch and the drum of that particular winch.

The present invention is concerned with the transmission of drive from a drive device into the transmission system of the yacht.

SUMMARY OF THE INVENTION

In the invention, distribution of drive between plural inputs into the transmission from respective outputs of a drive device are distributed in a plurality of ways; including both to one side and both to the other side and separately to each side of a two-sided transmission system of the yacht. This is without any change of speed; i.e. the inputs and outputs rotate at the same speed as each other. This may be achieved by using self-seeking dog clutches axially moveable relative to drive input or output means of the transmission system lying coaxially on a first axis, the said clutches being moved out of engagement from their associated means by face cams swept in an arc around a second axis parallel to the first axis and at angular relationships about that second axis so that determination of the angular position of the cams determines which one or more of the said clutches is or is not engaged.

It can be seen that a simple rotational movement of the cams by a lever or other control member associated with the axis of rotation, preferred positions of which may be firmly determined by detent means, readily offers a swift and positive means of changing the distribution of drive.

Other ways of driving the dog clutches may be used, however, and examples are electromagnetic or hydraulic drives.

I thus offer the possibility of directing the drive from the drive device separately to different sides of the yacht, in combination both to one side or to the other.

It is a further aspect of the invention that the distributor may be used to feed either or both of gearboxes situated at respective sides of the distributor, with independent control of the mode of distribution and of ratio selected in the or each gearbox.

Particular embodiments of the invention will now be described by reference to the accompanying drawings wherein.

Figure 1:
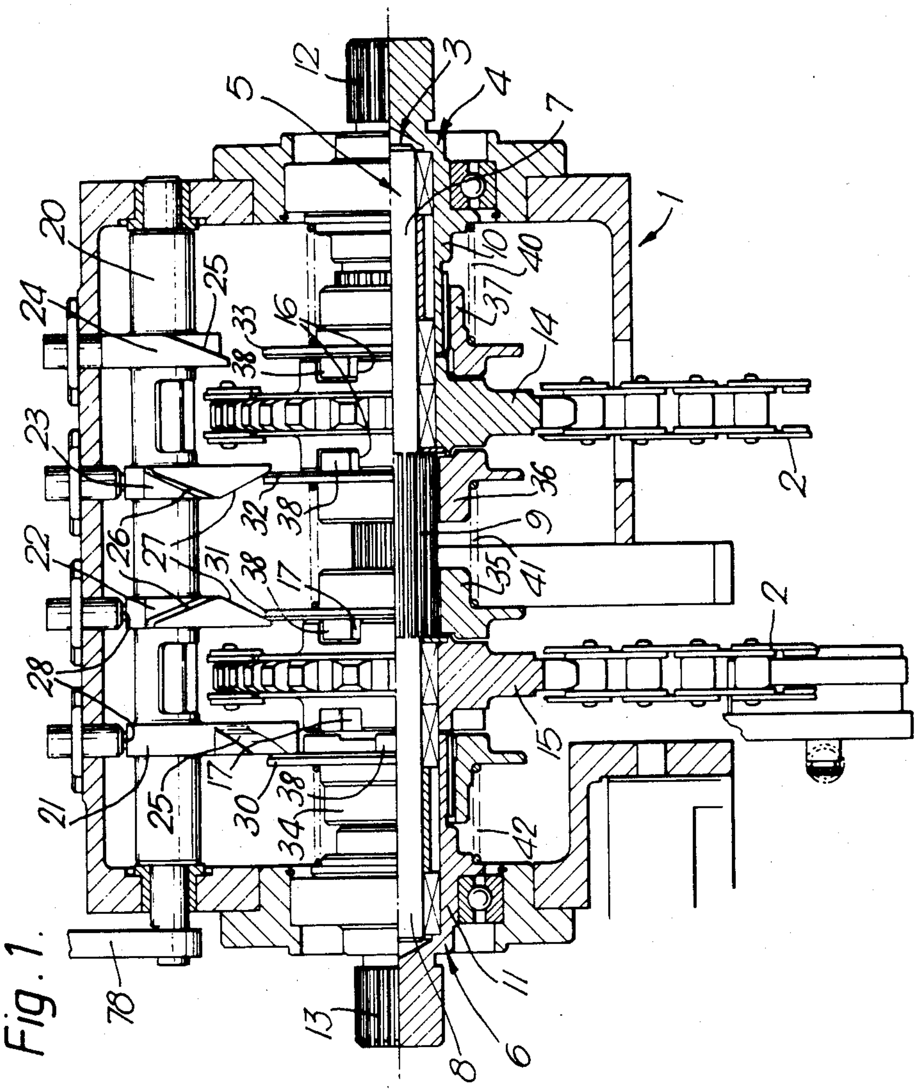
FIG. 1 is a view partly inside elevation and partly in radial section of a drive distribution box which is an embodiment of the invention.

A transmission distributor 1, FIG. 1, has two outputs which are coupled through e.g. shafts and universal joints to transmission rods to go to respective sides of the sailing vessel under its decking.

The purpose of the transmission distributor is to allow the output from input drive chains 2 to be applied together either to the starboard side of the yacht or to the port side or for drives to be applied separately to the port and starboard sides respectively.

In more detail the distributor 1 consists of a main shaft 3 with parts 4,5,6. The centre part 5 has end portions 7,8 and a splined middle 9; the outer parts 4,6 have ramplike portions 10,11 surrounding the portions 7,8 and splined ends 12,13 for output coupling to the transmission linkages. Chain drives 2 come in independently from the sprockets associated with two drive handles of a drive device and pass round sprockets 14,15 both mounted rotatably on bearings on respective end portions 7,8 of the centre part 5 of the shaft. Both axial faces of the sprockets 14 and 15 have at least two castellations 16,17 forming part of respective dog clutch assemblies. Parallel to the shaft 3 there is a cam shaft 20 on which are four face cams 21,22,23 and 24, face cams 21 and 24 having a single ramp such as 25 and 22 and 23 having a double ramp surface such as 26,27. Each cam is set at a predetermined angular relationship to each other on the shaft 20, with preferred orientations of the shaft being determined by the engagement of spring detent plungers 28 with slots in the periphery of the face cams.

On the main shaft 3 there is a plurality of chamfer-edged cam follower discs 30,31,32,33 mounted on bosses 34 to 37 made axially moveable on shaft parts 4,5 and 6 respectively. Bosses 35 and 36 are constrained to rotate with the centre part 5 of the shaft by the splining on its middle portion 9. Boss 34 is splined onto left-hand end part 6 by splining on the surface of the portion 11 of the latter, and boss 37 likewise onto right hand end part 4. The centre part 5 is journalled within the hollow portions 10,11 of these end parts 4,6 by means of roller bearings. Each disc 30–33 has on its surface dog projections 38 for engagement with the clutch recesses 17 and each is urged, by springs 40,41,42 respectively to self-seeking engagement between the respective clutches.

Given any particular relationship of the face cams 21–24 on their shaft 20 the rotational position of that shaft will determine whether one, two or three of the dog clutch pairs will be engaged, the arrangement of the cams being such that if their full thickness is engaged with the disc 30–33 the respective clutches will be disengaged.

In this example three positions of the control cam shaft are envisaged and in the one shown the dogs associated respectively with 35,36 and 37 are engaged while that associated with 34 is disengaged. The effect of that is that drives received in sprockets 14 and 15 are both transmitted to the right hand part 4 of the main shaft. Drive from sprocket 15 is transmitted through dog teeth 38 on the boss 35 to sprocket 14 via the middle portion 9 of the centre part of the shaft 5 and the dog teeth of boss 36 and from that sprocket through teeth 38 on boss 33 and on to the shaft part 10. Drive received in the sprocket 14 will of course also be so transmitted. However since disc 34 is held by cam 21 in a disengaged position no drive will be transmitted from either sprocket to the left hand end part 6. In a next position of rotation of the shaft 20 where the full thickness of both of face cams 22,23 is fully engaged with their respective cam follower discs 31,32 both of those centre dog clutches are held disengaged but because cam 21 now offers no resistance, cam disc 30 moves axially under the influence of its spring 42 towards sprocket 15 and the associated dog clutch becomes engaged. Face cam 24 has not yet engaged disc 33 so that clutch remains engaged. The effect then is that the separate drives received by sprockets 14 and 15 are transferred separately to the respective end parts 4,6 of the shaft. In a third position of rotation of the shaft 20 cam 21 remains clear of disc 30, cams 22 and 23 only present a thin part of their thickness to the associated discs 31,32 so that their dogs thereby remain engaged but cam 24 has presented its full thickness to disc 33 whose dogs are thereby held disengaged, and the drive from both the sprockets is transmitted together to the left hand part 6 of the main shaft.

Though the distributor may be used with or without a gearbox for equipping a drive-transmission system, we will now describe by way of example a layout for a large competition yacht where both are used in one system.

Figure 2:
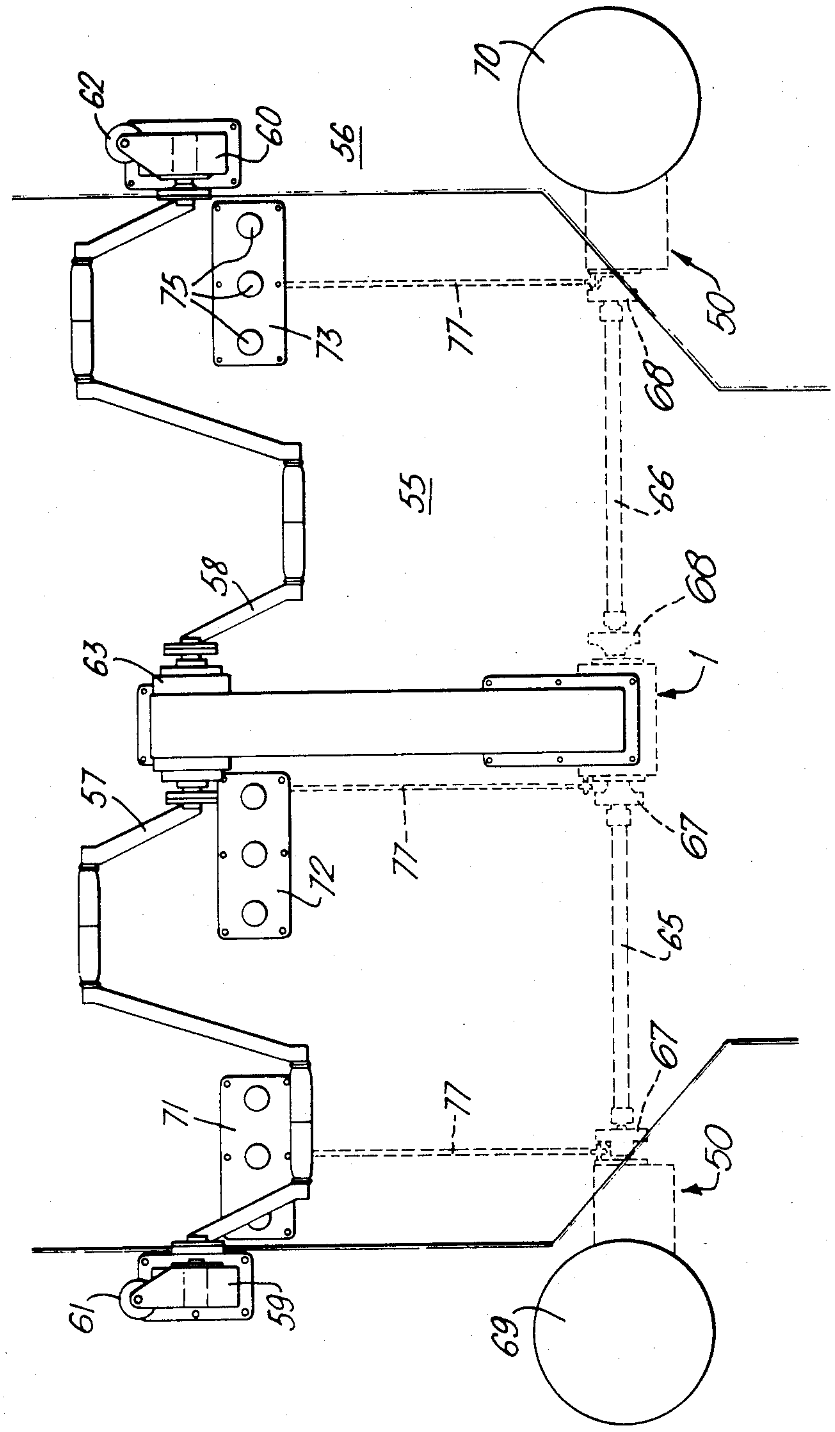
FIG. 2 is a plan view showing one layout of capstan and transmission in the cockpit area of a yacht.
Figure 3:
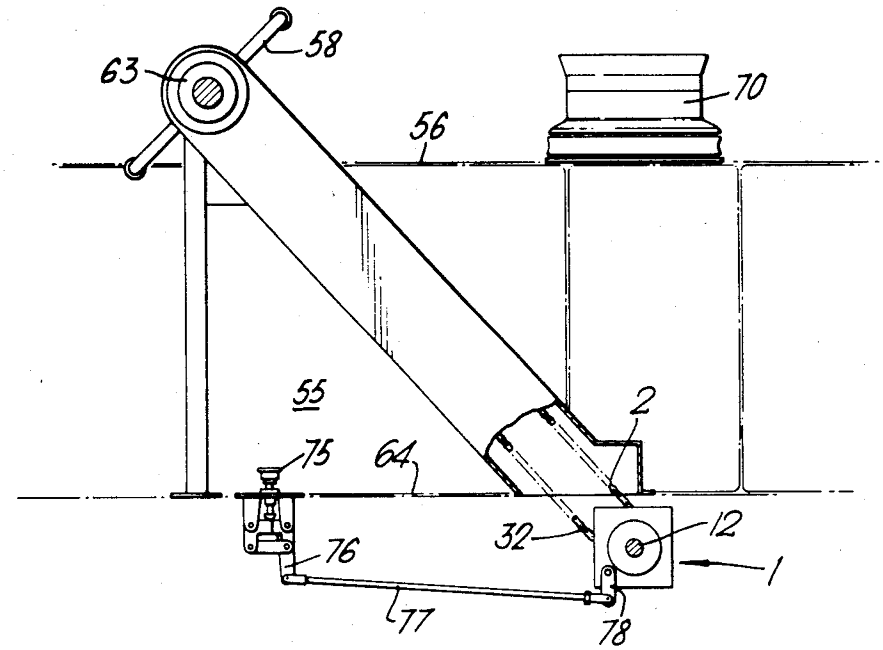
FIGS. 3 and 4 are respectively side and face views of that layout.
Figure 4:
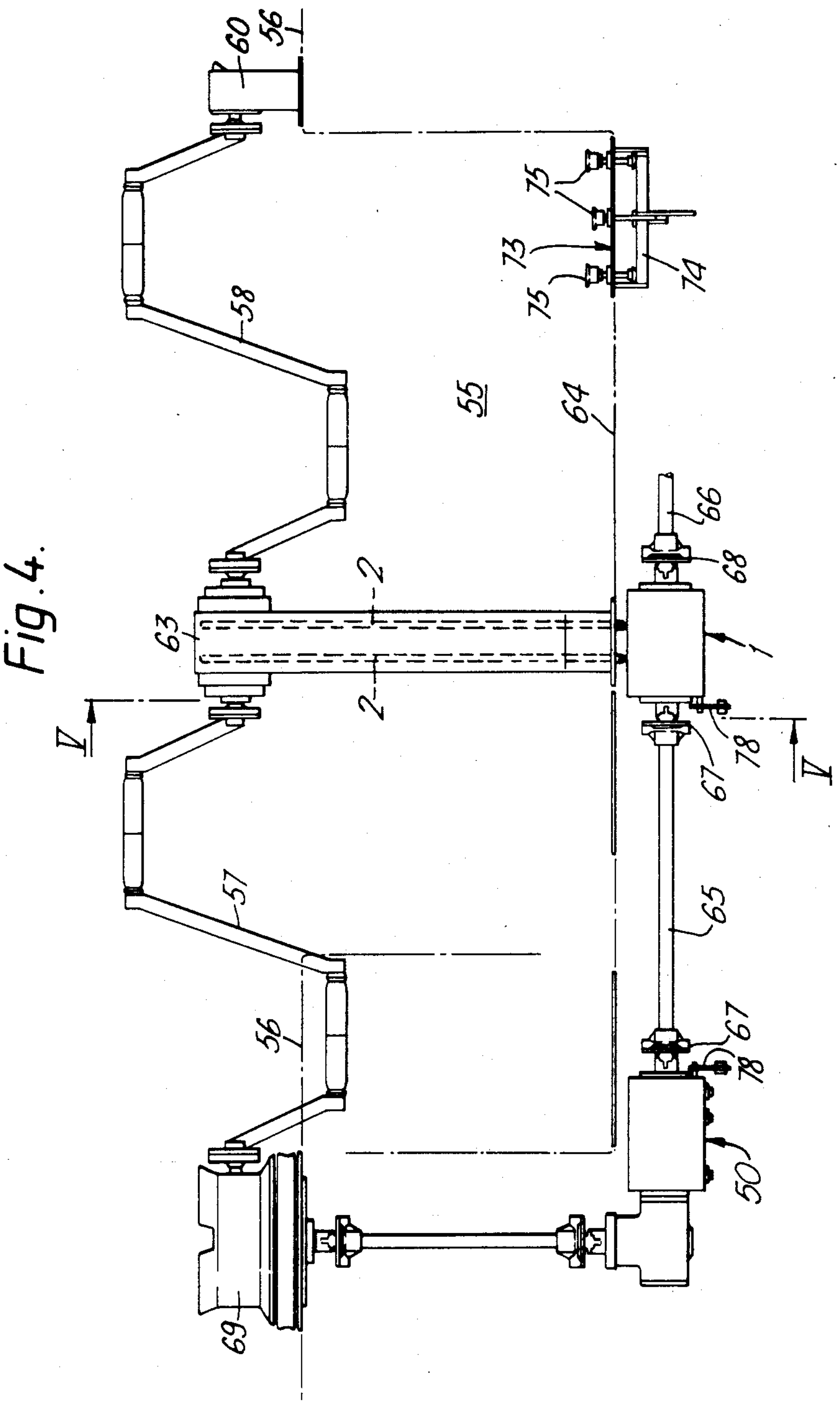

This layout is seen in FIGS. 2–4 showing the cockpit 55 and deck 56 of the yacht. Separate crank-drive handles 57,58 are journalled at the outermost ends in bearings 59,60 on the deck, which in this example also house spinnaker sheet lead rollers 61,62. The mutually nearer ends of the crank-handles are journalled in a housing 63 in which sprockets on the handles engage the respective drive chains 2 leading to the sprockets 14,15 in the distributor 1 mounted below the sole 64 of the cockpit.

Transmission shafts 65,66 are coupled to the outputs 12,13 of the distributor and to the inputs of respective gearboxes 50 through universal joints 67,68.

Output of each gearbox is via a bevel box and transmission shaft to a main winch 69,70. Transmission shafts may additionally or alternatively lead to other winches on the yacht.

Control of the cam shaft of the distributor 1 is by means of foot pedal assemblies 72 mounted in the sole of the cockpit. The same assembly may also be used for control of the gearboxes, and a more detailed description will be given with reference to such an assembly 73 controlling a gearbox 50. One of three rotational settings of a shaft 74 (FIG. 4) in each assembly is assured by pressing down one of three foot pedals 75 linked to the shaft 74 by crank arms. A further crank arm 76 is pivoted to a link arm 77 which at its far end is pivoted to a crank arm 78 on the cam shaft 20 of the gear box or distributor.

It can be seen that by operation of the various foot pedals the muscular effort exerted on the handles 57,58 may be applied both to one side or to the other of the yacht, or separately to the two sides, and in any case through any one of the ratios available in the respective gearboxes.

Control of gear change within the gearboxes may be by any suitable means, including dog-clutches controlled by face cams as in the distributor just described.

The dog-clutches in the distributor may be driven into or out of engagement by any suitable means—for example electromechanical or pneumatic drives—and where a cam-shaft such as 20 is used, its setting may be assured either by mechanical lever linkages as shown or directly through a gear-stick or otherwise e.g. hydraulically.

By selection of the number, shape and relative angle and setting of the cams on a shaft such as 20, additional possibilities of drive distribution between plural inputs and plural outputs may be achieved—for example in addition to or in substitution for any of the possibilities disclosed above, both inputs may be coupled together to both outputs, and there may be a completely disconnected, "neutral", condition.

Figure 5:
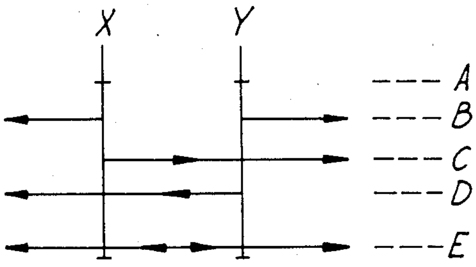
FIG. 5 is a diagram of various distribution possibilities.

These possibilities discussed are shown diagrammatically in FIG. 5, X and Y are the two drive inputs (e.g. sprockets 14,15 of the embodiment). Position A shows neutrality, no connection to the outputs. Position B shows separate drive to the two outputs, C both drives to one output and D both drives to the other. E shows both drives going in common to both outputs.

In the sailing craft, there may be separate gearboxes, as shown, between the distributor and the winches, or a single one, or none.

I claim:

1. A distributor for distributing rotational drive in a sailing craft, the distributor having a plurality of independently rotatable drive input means, a plurality of drive output means, said plurality drive input means and said plurality drive output means being coaxial on a single axis, and means for coupling in a first position two of said input drive means to one of said output drive means, coupling in a second position two of said input drive means to another of said output drive means and coupling in a third position one of said input drive means only to said one output drive means and another of said input drive means only to said another output drive means.

2. A distributor according to claim 1 wherein the plurality of inputs is two and the plurality of outputs is two.

3. A distributor according to claim 1 wherein the coupling means includes a main shaft, a plurality of dog-clutch parts lying coaxially on the main drive shaft, means for axially moving said dog-clutch parts in at least one axial direction, the main drive shaft having a plurality of independently-rotatable parts, a plurality of the dog-clutch parts being permanently constrained to rotate with respective ones of the parts of the main shaft respectively, and being couplable and uncouplable, by axial movement, with respective ones of the drive inputs and others of the dog-clutch parts being constrained to rotate with a further of the parts of the main shaft and being couplable or uncouplable, by axial movement, with respective ones of the drive inputs.

4. A distributor according to claim 3 wherein the means for causing axial movement of the dog-clutch parts comprises a plurality of face-cams on a cam shaft parallel with the main shaft, the dog clutch parts having respective cam followers engageable by the face-cams.

5. In combination, a sailing craft having a manually-rotatable drive means, a transmission system, a plurality of winches on the craft, the drive means having a plurality of separate drives to the transmission system, and the transmission system including a distributor with a plurality of inputs each associated with one of the separate drives, a plurality of outputs from the distributor, said plurality of inputs and said plurality of outputs to being coaxial on a single axis, respective transmissions from the outputs to the winches and a control means for the distributor, appropriate setting of the control means causing coupling in a first position within the distributor, appropriate setting of two of said input drive means to one of said output drive means, coupling in a second position two of said input drive means to another of said output drive means and coupling in a third position one of said input drive means only to said another output drive means.

6. The combination according to claim 5 wherein a gearbox is interposed between at least one of the winches and the distributor.

7. The combination according to claim 5 wherein the distributor has a plurality of dog-clutch parts lying coaxially on a main drive shaft, the main drive shaft having a plurality of independently-rotatable parts, two of the dog-clutch parts being permanently constrained to rotate with two of the parts respectively and being couplable and uncouplable, by axial movement, with respective drive inputs and two of the dog-clutch parts being constrained to rotate with the third part of the main shaft and being couplable or uncouplable, by axial movement, with respective drive inputs.

8. The combination according to claim 7 wherein the axial movement of the dog-clutch parts is controlled by a plurality of face-cams on a cam shaft parallel with the main shaft, the dog-clutch parts having respective cam followers engageable by the face-cams.

9. The combination according to claim 8 wherein the control means comprises a lever linkage operable by an operator of the drives to cause rotation of the cam shaft to any of said positions, corresponding to a desired coupling of the drives to one or more of the winches.

10. The combination according to claim 6 wherein the transmission go respectively to lateral sides of the craft, a said gearbox being interposed in the transmission on each lateral side of the distributor.

11. A distributor for distributing rotational drive in a sailing craft comprising:

a housing;

a plurality of independently rotatable and manually operable drive input means extending into said housing;

a plurality of drive output means extending out of said housing, said plurality of drive input means and said plurality of drive output means being coaxial on a single axis; and means for coupling in a first position two of said input drive means to one of said output drive means, coupling in a second position two of said input drive means to another of said output drive means and coupling in a third position one of said input drive means only to said one output drive means and another of said input drive means only to said another output drive means.

12. In combination, a sailing craft having a manually-rotatable drive means and a plurality of winches, said plurality of said winches being on respective lateral sides of the craft, a transmission system linking said drive means to said winches, the drive means comprising two separately rotatable handles disposed laterally of the craft and a chain and sprocket associated with each said handle, each said chain and sprocket being inboard of its associated handle, said transmission system comprising a distributor, both said chains leading to said distributor, a plurality of drive shafts laterally of said distributor for transmitting drive to said winches on respective lateral sides, and a control means for the transmission system whereby drives from said separate chains may be communicated in common to one lateral side of the craft or both to the other lateral side or separately to respective lateral sides.

* * * * *